US008233662B2

(12) United States Patent
Bhotika et al.

(10) Patent No.: US 8,233,662 B2
(45) Date of Patent: Jul. 31, 2012

(54) METHOD AND SYSTEM FOR DETECTING SIGNAL COLOR FROM A MOVING VIDEO PLATFORM

(75) Inventors: Rahul Bhotika, Albany, NY (US); Paulo Ricardo dos Santos Mendonca, Clifton Park, NY (US); Jens Rittscher, Ballston Lake, NY (US); Thomas Baby Sebastian, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1035 days.

(21) Appl. No.: 12/183,334

(22) Filed: Jul. 31, 2008

(65) Prior Publication Data

US 2010/0027009 A1  Feb. 4, 2010

(51) Int. Cl.
*G06K 9/00* (2006.01)
(52) U.S. Cl. ........................................................ 382/104
(58) Field of Classification Search .......... 382/100–107; 348/113–120; 356/27–30; 246/473 R–473 A
See application file for complete search history.

(56) References Cited

U.S. PATENT DOCUMENTS

| 6,937,744 | B1 | 8/2005 | Toyama |
| 7,356,425 | B2 | 4/2008 | Krahnstoever et al. |
| 2002/0054210 | A1 | 5/2002 | Glier et al. |
| 2006/0269104 | A1* | 11/2006 | Ciolli ............................ 382/104 |
| 2007/0047809 | A1* | 3/2007 | Sasaki ........................... 382/170 |
| 2007/0217654 | A1 | 9/2007 | Rao et al. |
| 2007/0219681 | A1* | 9/2007 | Kumar et al. .................... 701/19 |
| 2008/0137910 | A1* | 6/2008 | Suzuki et al. ................. 382/104 |
| 2009/0303077 | A1* | 12/2009 | Onome et al. ................ 340/901 |
| 2011/0128376 | A1* | 6/2011 | Bortolotto ..................... 348/143 |

OTHER PUBLICATIONS

Tamp P. Cao, Darrel M. Elton, John Delvin, Real-time Linear Projection Speed Sign Detection System in Low Light Conditions, Computer and Information Science. ICIS 2007. 6th IEEE/ACIS International Conference on Computer and Information Science, ISBN: 0-7695-2841-4, Issue Date: Jul. 11-13, 2007, Date of Current Version: Jul. 23, 2007, pp. 332-338.*

Piva, S. Zara, M. Gera, G. Regazzoni, C.S.; "Color-Based Video Stabilization for Real-Time On-Board Object Detection on High-Speed Trains"; Proceedings of the IEEE Conference on Advanced Video and Signal Based Surveillance 2003; IEEE Computer Society; ISBN: 0-7695-1971-7; (6 Pages).

Yelal, M.R. Sasi, S. Shaffer, G.R. Kumar, A.K.; "Color-Based Signal Light Tracking in Real-Time Video"; Proceedings of the IEEE International Conference on Video and Signal Based Surveillance 2006; IEEE Computer Society; ISBN:0-7695-2688-8; (5 Pages).

* cited by examiner

*Primary Examiner* — Atiba O Fitzpatrick
(74) *Attorney, Agent, or Firm* — Jason K. Klindtworth

(57) ABSTRACT

The present invention aims at providing a method for detecting a color of a signal light from a moving vehicle such as railroad train. The method includes capturing an image from a camera mounted on the moving vehicle and extracting candidate regions in the image that contain light region. The method further includes classifying the candidate regions as a signal light region or a non-signal light region and identifying the color of the signal light region.

23 Claims, 7 Drawing Sheets

METHOD AND SYSTEM FOR DETECTING SIGNAL COLOR FROM A MOVING VIDEO PLATFORM

CROSS REFERENCE TO RELATED APPLICATIONS

This application is related to the following U.S. patent application Ser. No. 12/183,326, entitled "Method and system for detecting a signal structure from a moving video platform" by Thomas Sebastian et al. and filed Jul. 31, 2008, which application is hereby incorporated by reference.

BACKGROUND

The present invention relates generally to detecting signal color from a moving video platform, and more specifically to detecting location and state of signal lights from a moving train.

Tracking a location of a signal structure and a color or state of a signal light has an important role in the transportation industry. These capabilities are major considerations when designing an automatic signal detection system. Auto detection of the position of the signal structure and the signal light color using computer vision techniques provides vital evidence in fraudulent accident claims and for improving the overall safety of the rail system. Additionally, these capabilities prevent accidents from occurring when the signal lights are not clearly visible due to weather or climate conditions or changing lighting conditions. Generally, for a locomotive, these kinds of accidents typically occur at railroad crossings. An investigation of an accident completely depends on the unadulterated information gathered at an accident zone. Limited information available from the accident zone causes problems for investigations. These investigations indirectly affect the organizations that are depending on them such as transportation, law enforcement and insurance agencies.

Vehicle mounted recording systems (VMRS) are one type of system that continuously monitor and record such events. In a VMRS system, a camera is mounted on a vehicle to capture events in real time. If an accident occurs, these captured event videos are used as evidence for an investigation. A VMRS, typically continuously records the events occurring on the rail path and area viewable through the camera system and also captures other onboard data such as locomotive speed, time, location, and direction headings. A VMRS does not, however, automatically detect the position of the signal structure or the color associated with the signal light.

Accordingly, it would be desirable to provide a system and a method to supplement a standard VMRS system or the like and that would automatically detect the location of the signal structure and the color of the signal light during daytime as well as during nighttime.

BRIEF DESCRIPTION

In accordance with one embodiment of the present invention, a method for detecting a color of a signal light from a moving vehicle is provided. The method includes capturing an image from a camera mounted on the moving vehicle and extracting candidate regions in the image that contain a light region. The method further includes classifying the candidate regions as a signal light region or a non-signal light region and identifying the color of the signal light region.

In accordance with one embodiment of the present invention, a system for detecting color of a signal light is provided. The system includes a camera to capture images from a moving vehicle. The system further includes a filter for extracting light regions from a candidate region in the image and a classifier for classifying the light regions as a signal light region or a non-signal light region and detecting the color of the signal light region.

In accordance with another embodiment of the present invention, a computer readable storage medium having a code is provided. The code provides algorithm for extracting candidate regions in an image that contain a light region. The code is further written for classifying the candidate regions as a signal light region or a non-signal light region and identifying color of the signal light region.

In accordance with yet another embodiment of the present invention a method for detecting a state of signal light from a moving vehicle is provided. The method includes capturing a video from a camera mounted on the moving vehicle, extracting images from the video and detecting light regions in the image corresponding to the signal light. The method further includes identifying color of the signal lights, analyzing two or more signal lights and tracking the detection of the state of the signal light to eliminate any false detection.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

As discussed in detail below, embodiments of the present invention provide a method for detecting a signal color from a moving video platform. Although the present discussion focuses on rail systems and locomotives, the system is applicable to any moving vehicle, such as a heavy truck, controlled by traffic signals when in operation.

Figure 1:
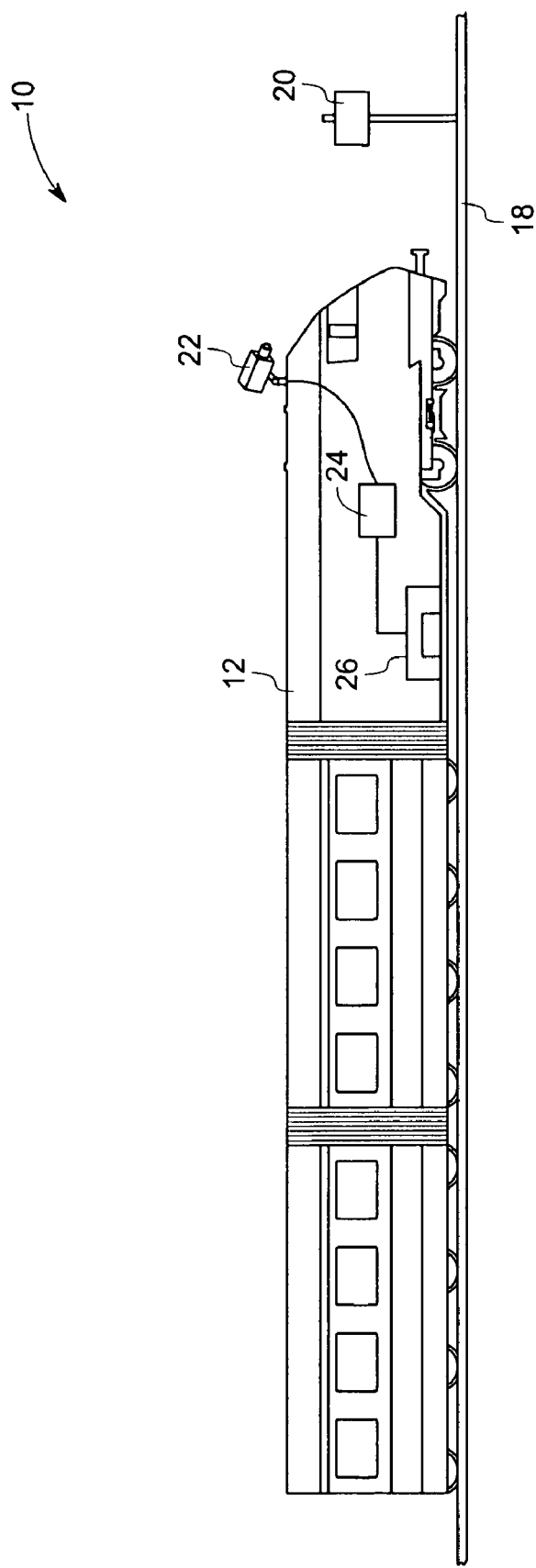
FIG. 1 is a diagrammatical representation of an exemplary system for detecting a signal color in a railroad train, in accordance with an embodiment of the present invention.

Referring now to the drawings, FIG. 1 illustrates an exemplary system 10 for detecting a color of the signal light, which system 10 is mounted inside a locomotive 12 of a railroad train. As discussed above, this invention is broadly applicable and is not limited to any particular type of moving vehicle. While the drawing depicts a steam driven locomotive, this invention can be utilized with all varieties of rail systems including electric and diesel locomotive systems.

As the railroad train travels along the rail track 18 a traffic signal 20 located along the track 18, provides visual cues to a locomotive driver. For example, a yellow traffic signal indicates that the locomotive driver should be prepared to stop the railroad train at the next traffic signal 20. A red traffic signal indicates that the driver should stop the railroad train and a green traffic signal indicates that the next traffic signal 20 will also be a green signal or a yellow signal. It should be noted that, in another railway signaling system, the colors of the traffic signals might provide various different visual cues.

In accordance with one embodiment of the instant invention, a video camera 22 is mounted on the locomotive to acquire video or still images of the surroundings of the locomotive. In one embodiment, the camera 22 is a pan-tilt-zoom (PTZ) camera that is configured to pan about a vertical axis, tilt about a horizontal axis, and control a lens assembly to enable the camera 22 to zoom. In one embodiment, a high-speed camera may be used instead of a video camera. In another embodiment, the camera 22 is housed in an enclosure for protection from the surrounding environment. In yet another embodiment, more than one camera may be mounted on the locomotive to acquire video or still images of the surroundings.

A video signal (not shown) is generated by the camera 22 in correspondence to the still images or videos collected, and the video signal is transmitted to a processor 24. The processor 24 processes and analyzes the video signal and detects the signal color. The processor 24 receives programmed instructions, from software, firmware and data from a memory and performs various operations using the data and instructions.

Processor may include an arithmetic logic unit (ALU) that performs arithmetic and logical operation and a control unit that extracts instructions from memory and decodes and executes the instructions, calling on the ALU when necessary. For example, the memory used may be random-access memory (RAM) and read-only memory (ROM). In addition, the memory may include an operating system, which operating system executes on the processor. The operating system performs basic tasks that include recognizing input, sending output to output devices, keeping track of files and directories and controlling various peripheral devices. In one embodiment, the results of the signal color detection are sent to a control room (not shown) via a remote monitoring system (26).

As used herein, references to "processor" are to be understood to refer to central processing units, microprocessors, microcontrollers and any other circuit or processor capable of executing the functions described herein. Similarly, references to "software" and "firmware" are interchangeable, and are to be understood to refer to and include any computer program stored in memory for execution by the processor 24.

The memory may also store a database composed of a variety of information that may be used in conjunction with the video signals acquired. The database may include data including, but not limited to: (i) the locations of railway track routes, and track mapping, (ii) the locations of signal structures in those railway track routes, and (iii) the locations of railroad crossings. The database can also assist to improve the accuracy of the signal color detection algorithm, as discussed in more detail below.

Figure 2:
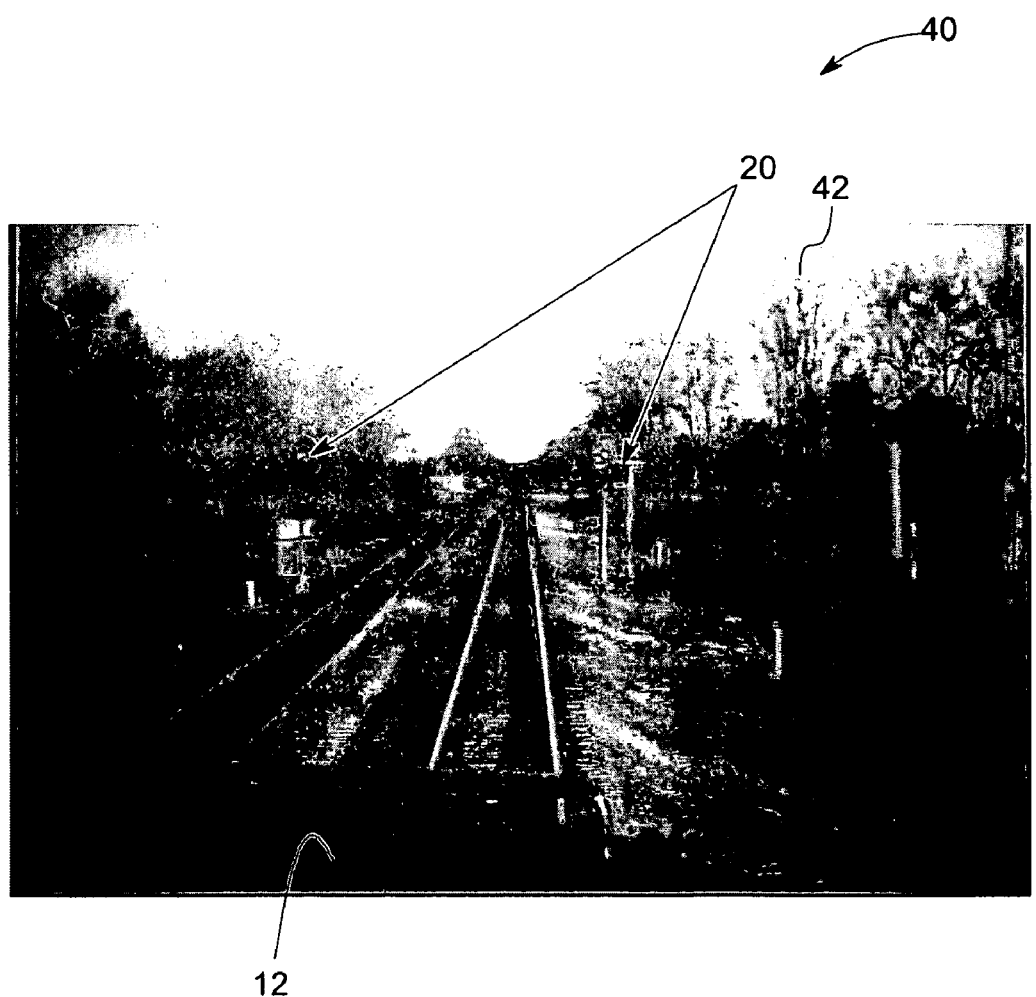
FIG. 2 is a pictorial view of an image taken from a camera mounted on a railroad train during daytime representing various vertical structures.

FIG. 2 is pictorial view 40 of an image taken from the video camera 22 (FIG. 1) mounted on the locomotive 12 during the daytime. The image shows signal structures 20 located along the track along with various other vertical structures like trees 42. One challenge with automatic signal detection systems is to reliably detect or identify signal structures 20 amongst all of the trees, physical structures, and other objects surrounding the track. Variations in the signal structure locations and looming effects from the camera motion also make it difficult to detect the signal structure. As will be appreciated by those skilled in the art, looming refers to the rapid expansion http://en.wikipedia.org/wiki/Expansion in the size of an object or the signal structure, so that its image becomes increasingly large. During daytime the camera may not capture all color pixels in the signal light. Thus, in one embodiment, a high-resolution camera is used to detect the signal color during daytime.

Figure 3:
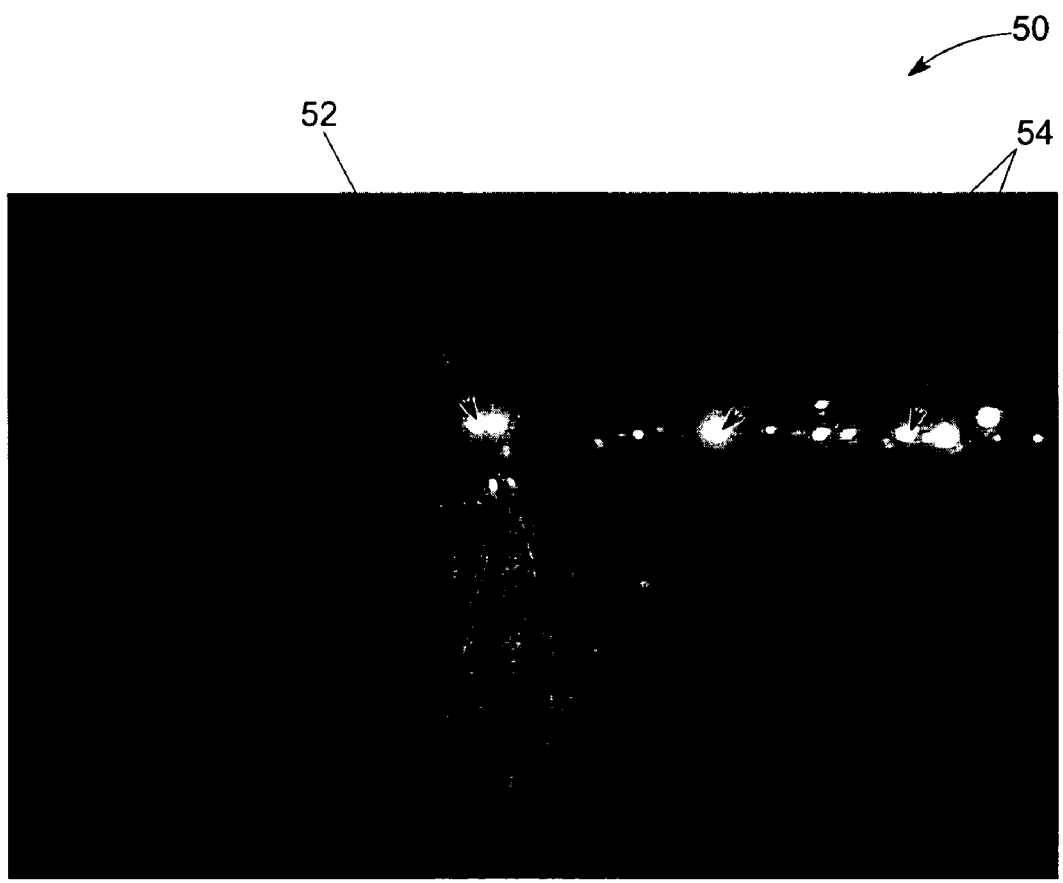
FIG. 3 is a pictorial view of an image taken from the camera mounted on the railroad train during nighttime showing various lights.

Similarly, FIG. 3 is a pictorial view 50 of an image taken from the video camera 22 (FIG. 1) during nighttime. The image shows lights corresponding to railway signals 52 along with various other lights 54 such as, lights on roads, lights in parking lots and lights on adjacent tracks. The signal structures 20 (FIG. 1) are also not visible in the image. As the image demonstrates it is difficult to detect the presence of a signal structure at night and even more difficult to detect the signal color for automatic signal detection systems. Other factors such as light saturation, light reflection and color bleeding also contribute to this challenge.

Figure 4:
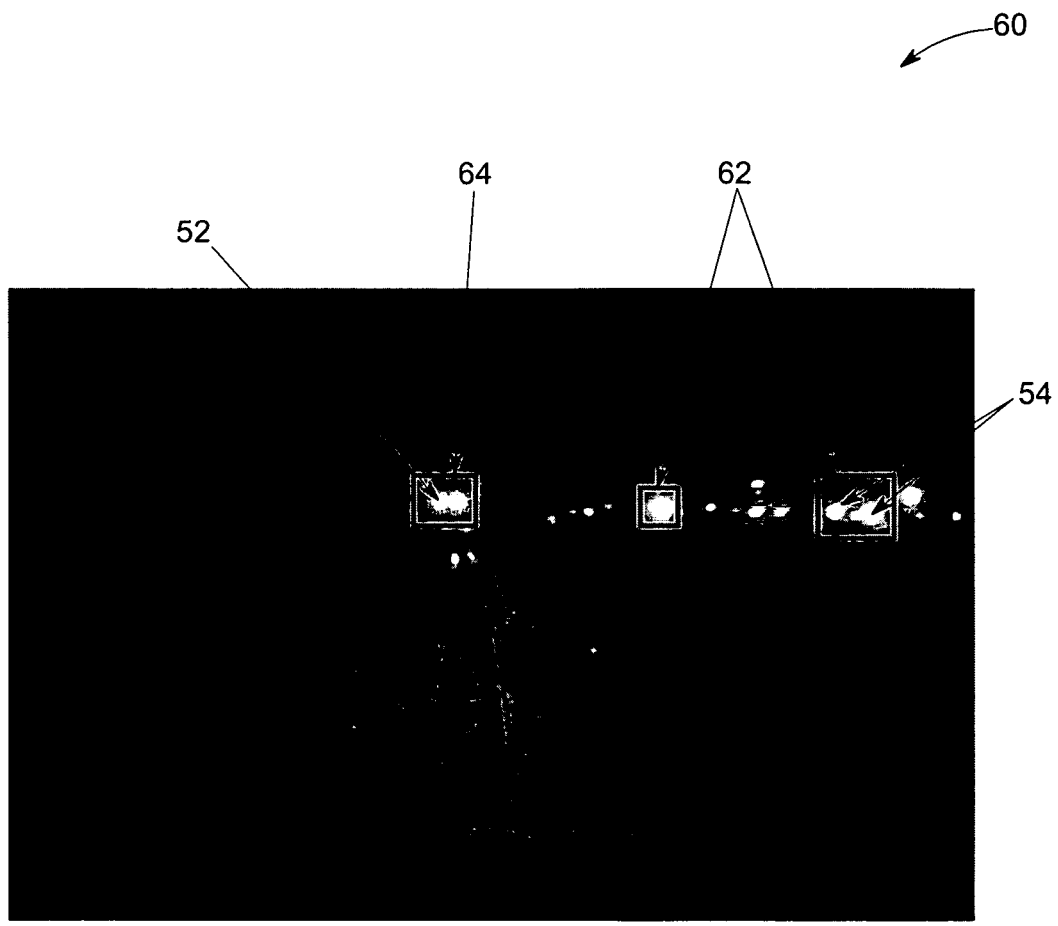
FIG. 4 is a pictorial view of an image taken from the camera mounted on the railroad train during nighttime and candidate boxes of the lights.

FIG. 4 is a pictorial view 60 of an image taken from the video camera during nighttime with candidate boxes. As in FIG. 3, the image shows lights corresponding to railway signals 52 and various other lights 54. The image of FIG. 4 is same as the image of FIG. 3. However, candidate boxes 62, 64 are provided onto the lights. The detection of signal lights in the complete image taken by the camera is not typically useful. A search space in the image is restricted by predefining a candidate region. The candidate region is the region where the signal lights are likely to be in the image. A camera calibration technique is used to predefine the candidate region. The color pixels in the image are measured and candidate boxes are placed in the image where the non-black color pixels are higher in concentration. Those are the probable light regions in the image. Only those candidate boxes are analyzed for color detection, whose size matches with a predefined candidate box size. The predefined candidate box (not shown) is determined by camera calibration. The size of the predefined candidate box is approximately equal to the signal light size. In one embodiment, an exemplary camera calibration technique is used to establish connection between the signal light measurement and the measurement of the image acquired by the camera. For example, the camera calibration technique is used to map measurements in world coordinates to image coordinates. The measurements may include for example, the height of the signal structure, diameter of the signal light, the width of the track, and an estimate of the ground plane. The camera calibration involves determining various projection matrices. The projection matrix provides the relationship between actual signal light and its image. For example, if the signal light is located at 100m from the locomotive, then the projection matrix determines its size in the image for that distance and provides the predefined candidate box of that size. Similarly, various other predefined candidate boxes are determined for the signal lights located at various distance points from the locomotive. It should be noted that, various other methods of camera calibration can also be used in embodiments of the present invention.

Figure 5:
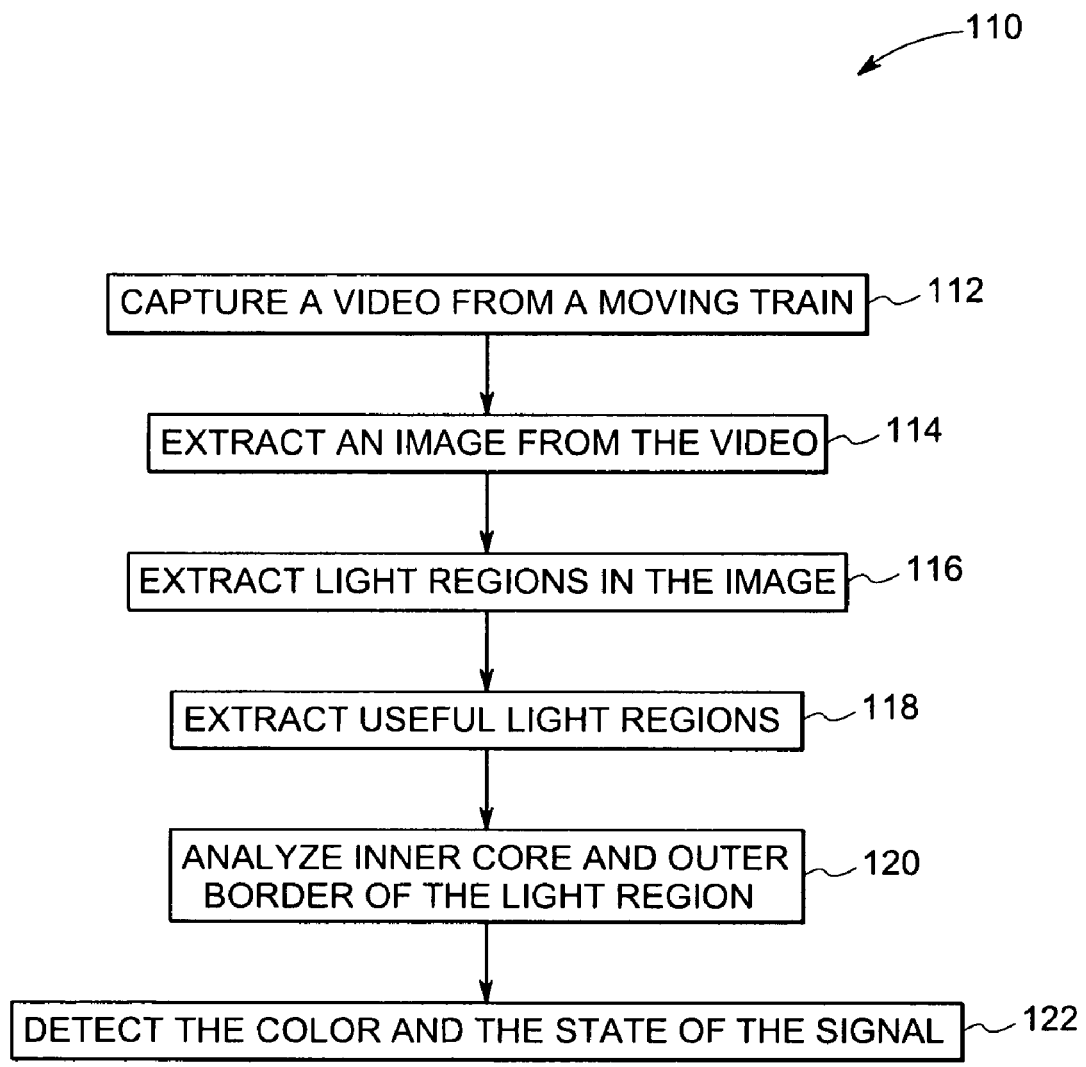
FIG. 5 is a flow chart representing steps in an exemplary method of detecting the signal color, in accordance with an embodiment of the present invention.

FIG. 5 is a flow chart representing steps in an exemplary method or algorithm 110 for detection of the signal color during nighttime. The method includes acquiring a video or still images from a moving train in step 112. As explained earlier, the video is acquired from a video camera or a high-speed digital camera mounted on the locomotive. The video may be in the form such as, but not limited to, a MPEG file or an AVI file and the still image may be in the form of a JPEG file or a TIFF file. In step 114, an image is extracted from the video. The video image during nighttime is shown in FIG. 3. As can be seen, the signal structure is typically not visible during nighttime. However, various lights are visible in the image. The lights corresponding to a railway signal are identified first and then the signal light color is determined. In step 116, different candidate regions 62, 64 (FIG. 4) in the image that contain light regions, representative of different light sources, are extracted. In one embodiment, a camera calibration technique is used to extract the candidate regions. The light regions in the image are extracted and a list of respective squares or ellipses with location and size of each light region is provided as output.

In one embodiment, a Difference of Gaussians (DoG) filter is used to extract the light regions. As will be appreciated by those skilled in the art, a DoG filter is an image enhancement algorithm that involves the subtraction of one blurred version of an original grayscale image from another less blurred version of the original image. The blurred images are obtained by convolving the original grayscale image with Gaussian kernels having differing standard deviations. In step 118, light regions corresponding to respective railway signals are extracted. In this step, the candidate regions are classified as signal light regions or non-signal light regions. This is achieved by removing the light regions of smaller or bigger size compared to the light regions representative of railway signals extracting the candidate regions of predefined sizes and predefined shapes. In one embodiment, a region mask may be applied to improve the extraction of signal light regions or light regions respective to railway signals. In step 120, the inner core and the outer border of extracted light regions are analyzed for color detection i.e. the color pixels in those regions are measured and in step 122, the signal light color is detected as will be described subsequently with respect to FIG. 7.

In one embodiment, a tracking algorithm is used for tracking the color and presence of the signal light in the image to eliminate a false detection or to eliminate a detection of the signal light and color that is not correct. This enhances robustness of the signal color detection. The tracking algorithm properly weighs the confidence in detection of the signal color in each single-frame of a video sequence. The signal structure location database stored in the memory may also be used in this algorithm. The detected signal lights are then cross-checked against the images in the database. It should be noted that other tracking algorithms can also be used in one embodiment of the present invention.

Figure 6:
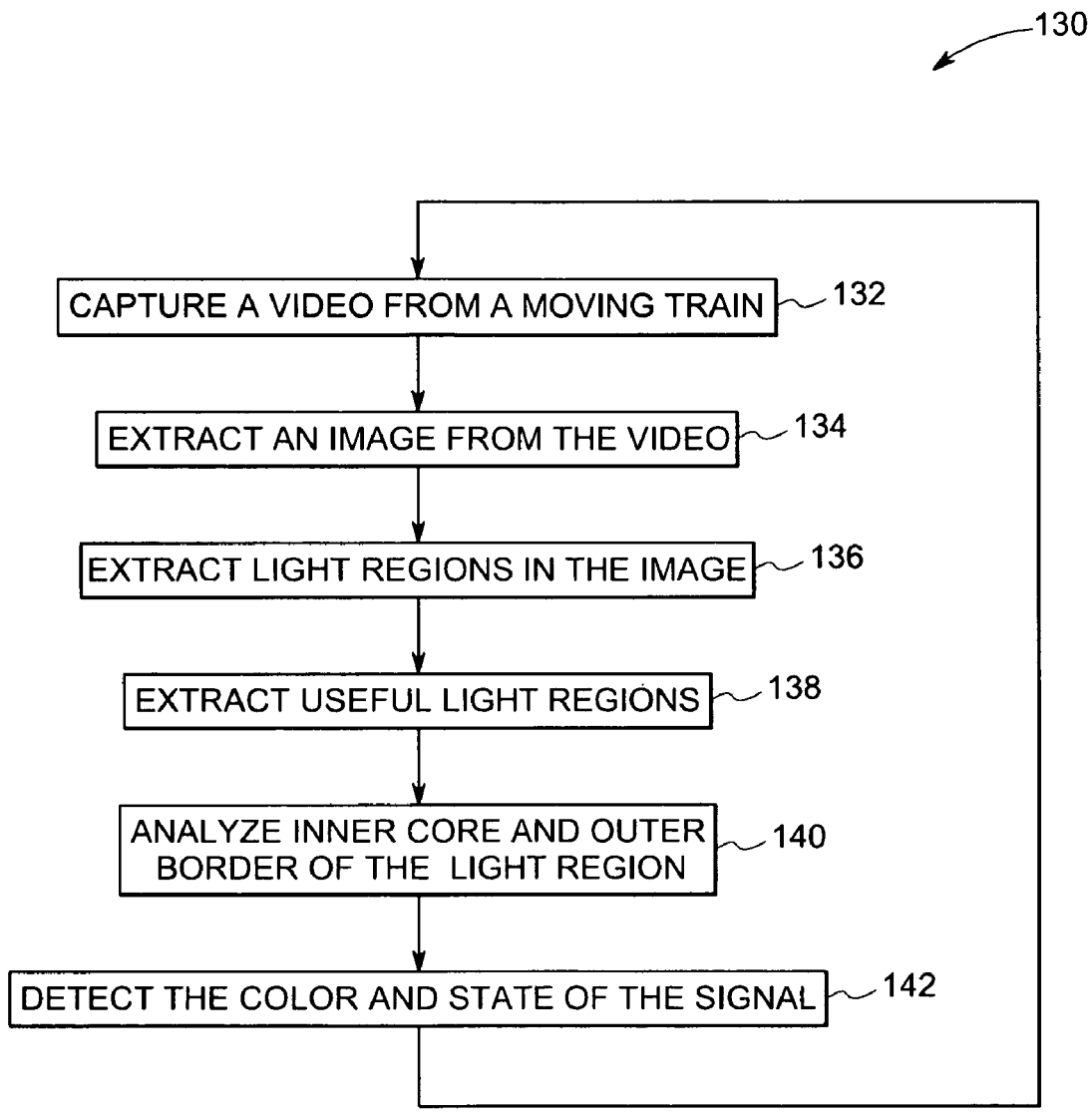
FIG. 6 is a flow chart representing steps in an exemplary method of detecting and analyzing a blinking signal, in accordance with an embodiment of the present invention.

In another embodiment, the algorithm of FIG. 5 is modified as shown in the algorithm 130 of FIG. 6 from steps 132 to 142. FIG. 6 is an extension of the algorithm of FIG. 5 to integrate the signal light color information across time and to generalize a set of decision rules for analyzing the visual cue of the color of the signal light. The set of decision rules is programmed and stored in the memory of the processor. For example, a blinking signal light in a railway signal typically provides a visual cue to the driver. This visual cue is stored as a rule corresponding to the blinking of the signal. In FIG. 6, the feedback loop enables integration of information across time or across more than one image in order to determine the visual cue of the signal light. When blinking signal light provides a visual cue, analyzing only one image is not sufficient. Thus, two or more sequential images are analyzed, the signal light color is detected and then the decision regarding the visual cue of the signal light is determined. In another embodiment, the color of two different signal lights together provides the visual cue. In such a scenario, two colors of different light regions are detected simultaneously and the decision regarding the visual cue of the signal light is determined.

Figure 7:
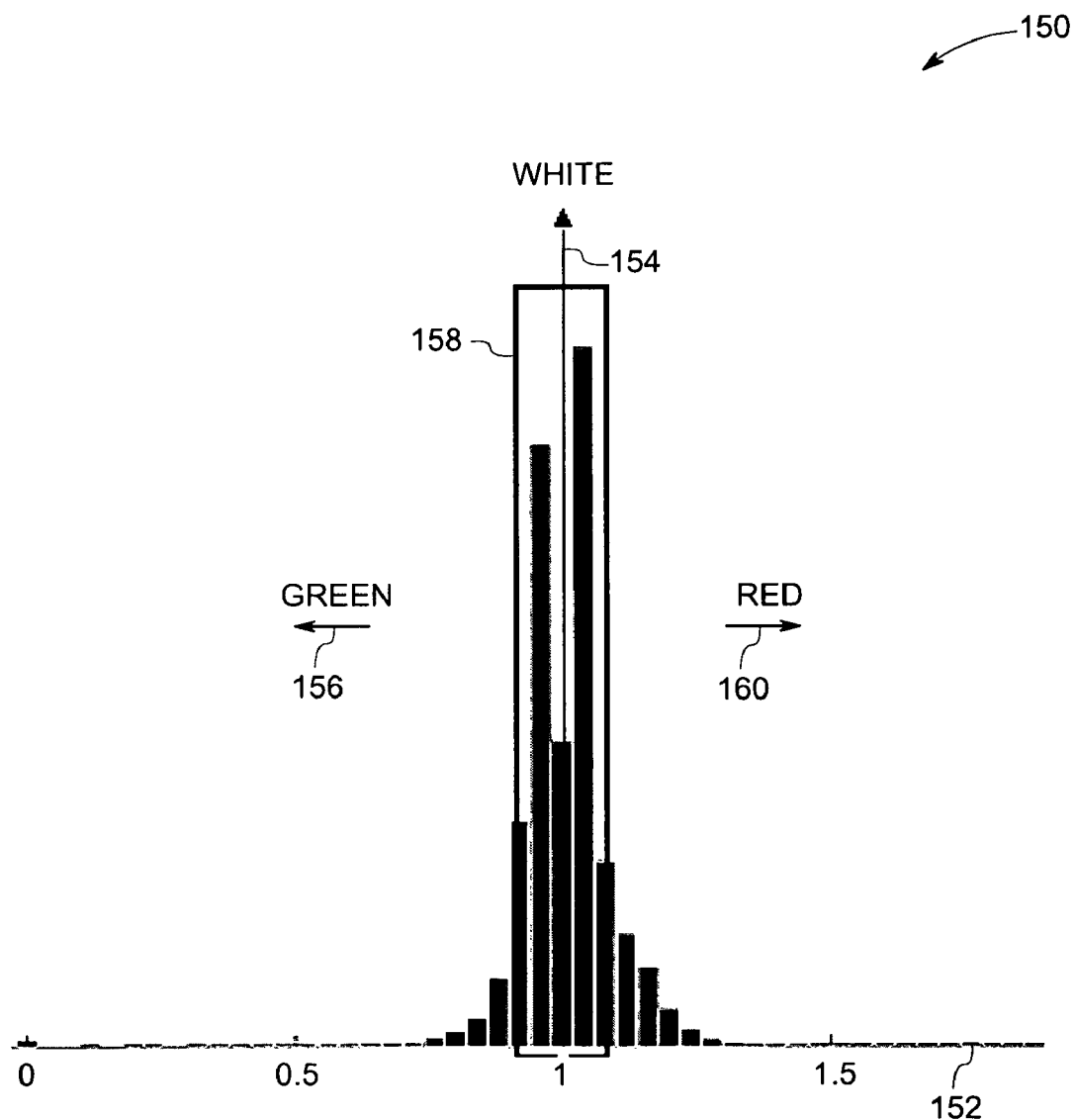
FIG. 7 is a histogram representing various color pixels in an image.

In one embodiment of the present invention an image histogram is used to detect the color of the signal. FIG. 7 is an image histogram 150 representing various tonal pixels in an image. In the exemplary histogram of FIG. 7, the horizontal axis 152 represents, color variation of a ratio of a red color versus a green color. The vertical axis 154 represents the amount of pixels detected in the image acquired by the camera for a particular color. The left hand side 156 of the horizontal axis 152 represents a green area, the middle 158 represents a white area and the right hand side 160 represents a red area in the signal light. The vertical axis 154, on the other hand, represents the size of the area captured in each one of these zones. For example, if the ratio of red versus green color is more than one, then the signal color is detected as red color. If, however, the ratio of red versus green color is lower than one, then the signal color is detected as green color. When the ratio of green to red is approximately one, it means detecting the color is difficult and it is considered a white color. In one embodiment, different image histograms are used depending on the color of the signal light. In yet another embodiment, the image histogram detects the signal light saturation. While this embodiment utilizes image histograms to determine color, this is not a limitation of the instant invention. In fact, any mechanism of color identification and categorization can be utilized.

As will be appreciated by those of ordinary skill in the art and as described earlier, the foregoing algorithms and algorithm steps may be implemented by a suitable computer program code on a processor-based system, such as a general-purpose computer or a special-purpose computer.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for detecting a color of a signal light from a moving vehicle comprising:
   capturing an image from a camera mounted on the moving vehicle;
   extracting candidate regions in the image that contain a light region based on a database comprising locations of signal structures along railway tracks;
   classifying the candidate regions as a signal light region or a non-signal light region; and
   identifying the color of the signal light region;
   wherein extracting candidate regions in the image that contain a light region comprises mapping a set of measurements in world coordinates to a set of measurements in image coordinates based on a projection matrix.

2. The method of claim 1, wherein the moving vehicle comprises a railroad train.

3. The method of claim 1, wherein extracting the candidate regions comprises calibrating the camera.

4. The method of claim 1, wherein extracting the candidate regions comprises extracting a location and a size of the candidate region using a filter.

5. The method of claim 4, wherein the filter comprises a Difference of Gaussians (DoG) filter.

6. The method of claim 1, wherein classifying the candidate regions comprises extracting the candidate regions of predefined sizes and predefined shapes.

7. The method of claim 1, wherein identifying the color of the signal light region comprises measuring color pixels in an inner core and an outer border of the signal light region.

8. The method of claim 1, further comprising tracking the color of the signal light region in the image to eliminate false detections.

9. A system for detecting a color of a signal light comprising:
- a camera configured to capture images from a moving vehicle;
- a filter configured to extract light regions from candidate regions in the image; and
- a classifier configured to classify the light regions as a signal light region or a non-signal light region and to detect the color of the signal light region;
- wherein candidate regions are determined by mapping a set of measurements in world coordinates to a set of measurements in image coordinates based on a projection matrix.

10. The system of claim 9, wherein the camera comprises a video camera or a high-speed digital camera.

11. The system of claim 9, wherein the camera comprises a pan-tilt-zoom camera.

12. The system of claim 9, wherein the moving vehicle comprises a railroad train.

13. The system of claim 9, wherein the candidate region is provided by camera calibration.

14. The system of claim 9, wherein the filter and the classifier are implemented by appropriate programming of a digital processor.

15. The system of claim 9, wherein the filter comprises difference of gaussians filter.

16. A non-transitory computer-readable storage medium comprising computer-readable instructions of a computer program that, when executed by a processor, cause the processor to perform a method for detecting a color of a signal light in an image comprising:
- extracting candidate regions in the image that contain a light region;
- classifying the candidate regions as a signal light region or a non-signal light region;
- identifying color of the signal light region;
- wherein candidate regions are determined based on a database comprising locations of signal structures along railway tracks; and
- wherein extracting candidate regions in the image that contain a light region comprises mapping a set of measurements in world coordinates to a set of measurements in image coordinates based on a projection matrix.

17. The non-transitory computer-readable storage medium of claim 16 comprising a code for detecting a location and a size of the light region.

18. The non-transitory computer-readable storage medium of claim 16 comprising a code for measuring color pixels in an inner core and an outer border of the signal light region.

19. A method for detecting a state of signal lights from a moving vehicle comprising:
- capturing a video from a camera mounted on the moving vehicle;
- extracting images from the video;
- detecting light regions in the image corresponding to the signal light;
- identifying color of the signal lights;
- analyzing color of the signal lights to obtain a visual cue based on a set of decision rules; and
- utilizing a tracking algorithm to detect the state of the signal light to eliminate a false detection;
- wherein detecting light regions in the image corresponding to the signal light comprises mapping a set of measurements in world coordinates to a set of measurements in image coordinates based on a projection matrix.

20. The method of claim 19, wherein the state of the signal light comprises an on state or an off state or a blinking state.

21. The method of claim 19, wherein analyzing color of the signal lights comprises comparing color of two or more signal lights.

22. The method of claim 19, wherein analyzing color of the signal lights comprises identifying color of the signal light in two or more sequential images.

23. The method of claim 1, wherein identifying the color of the signal light region comprises utilizing an image histogram comprising tonal pixels of color variations in the image.

* * * * *